(12) United States Patent
Okada

(10) Patent No.: US 6,934,418 B2
(45) Date of Patent: Aug. 23, 2005

(54) IMAGE DATA CODING APPARATUS AND IMAGE DATA SERVER

(75) Inventor: Sadami Okada, Tokyo (JP)

(73) Assignee: Nikon Corporation, Tokyo (JP)

( * ) Notice: Subject to any disclaimer, the term of this patent is extended or adjusted under 35 U.S.C. 154(b) by 598 days.

(21) Appl. No.: 10/142,910

(22) Filed: May 13, 2002

(65) Prior Publication Data

US 2003/0044077 A1 Mar. 6, 2003

(30) Foreign Application Priority Data

May 14, 2001 (JP) ........................................ 2001-143676

(51) Int. Cl.$^7$ .............................................. G06K 9/36
(52) U.S. Cl. ........................ 382/240; 382/239; 382/248
(58) Field of Search ...................... 348/234; 375/240.18, 375/240.11; 382/232, 233, 238, 248, 250, 240, 239

(56) References Cited

U.S. PATENT DOCUMENTS 6,473,533 B1 * 10/2002 Yokose et al. .............. 382/248
6,516,096 B2 *  2/2003 Yokose et al. .............. 382/248
6,647,149 B2 * 11/2003 Keeney et al. .............. 382/240
6,825,876 B1 * 11/2004 Easwar et al. .............. 348/234

OTHER PUBLICATIONS

Marino et al., A DWT–Based Perceptually Lossless Color Image Compression Architecture, IEEE Conference on Signals, Systems & Computers, vol. 1, Nov. 1998, pp. 149–153.*

Yasuki Nomizu, Tricpes WHITE series No. 209, "Next generation image coding method JPEG 2000", p. 139 1.3–6.

ISO/IEC FDIS 15444–1, "Information technology–JPEG 2000 image coding system", p. 361.26–p.137 1.13.

Taubman, Marcellin, "JPEG 2000 Image Compression Fundamentals, Standards and Practice", p. 570–572, p. 729–730, p. 628–631.

Pennebaker, Mitchell, "JPEG Still Image Data Compression Standard", p. 23–25, p. 101–105.

U.S. Appl. No. 10/141,854, filed May 10, 2002, Ishiga.

* cited by examiner

Primary Examiner—Anh Hong Do
(74) Attorney, Agent, or Firm—Oliff & Berridge, PLC

(57) ABSTRACT

An image data coding apparatus having a coding unit that generates coded data after generating a transform coefficient by implementing Wavelet transform on image data, includes: a storage unit that stores coded data which the coding unit generates by coding image data which have not been sub-sampled; an information obtaining unit that obtains compression-related information indicating a compression rate or a restored image quality; and a re-coding unit that changes a sub-sampling ratio of individual color components constituting the coded data stored in the storage unit in conformance to the compression-related information and generates new coded data.

7 Claims, 11 Drawing Sheets

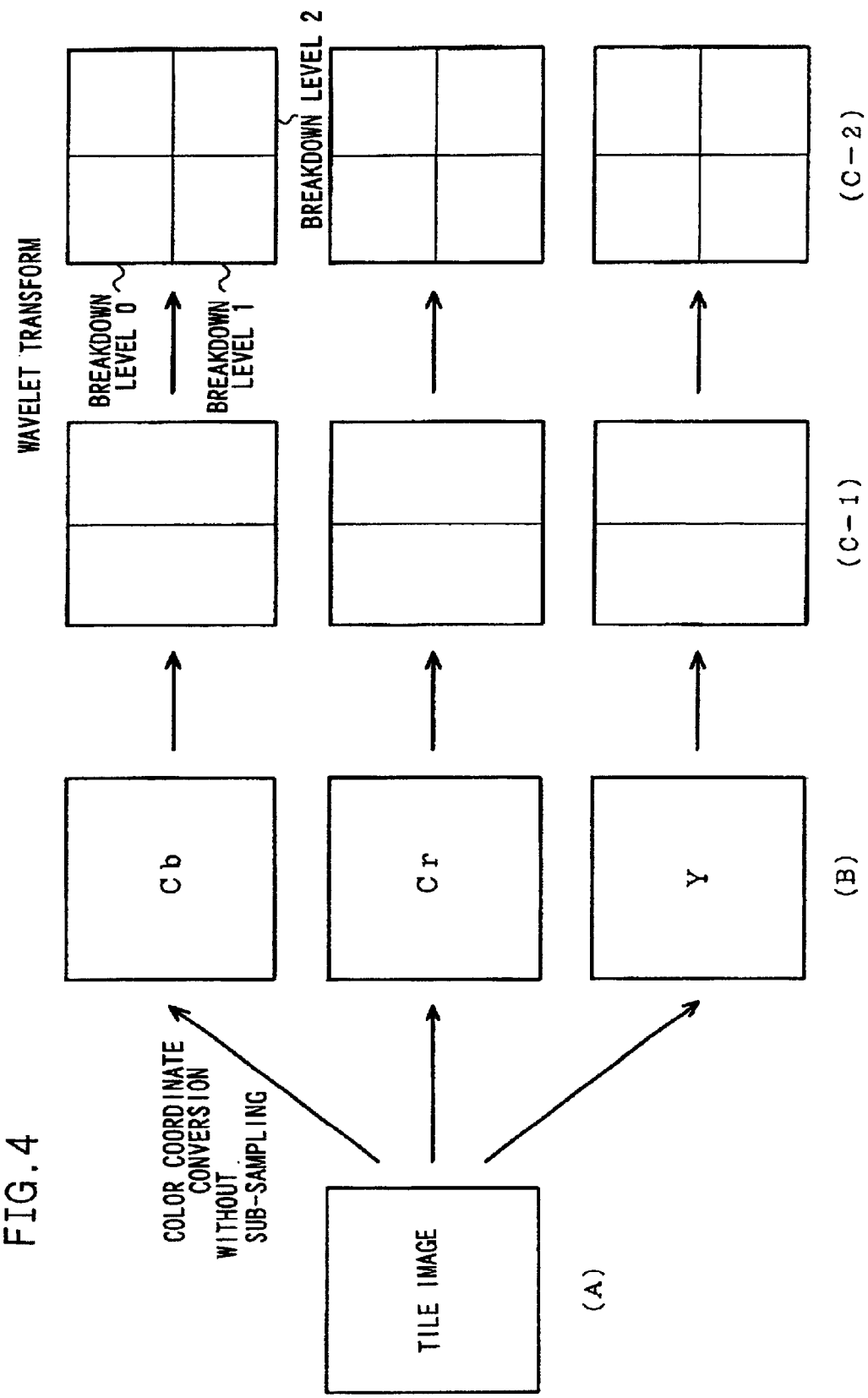

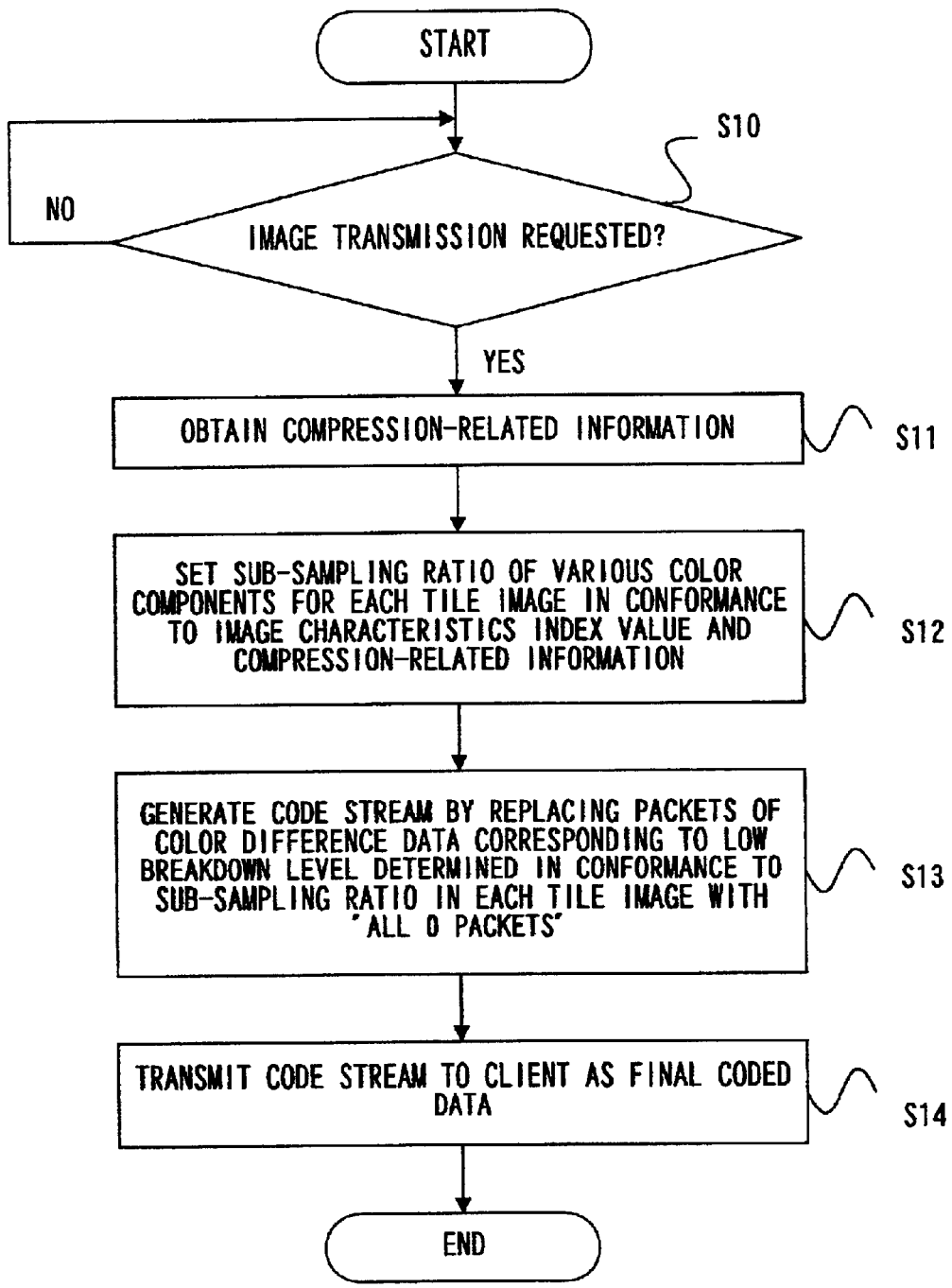

FIG.6

EXAMPLES OF SUB-SAMPLING RATIO SETTINGS
WHEN THERE ARE FOUR COMPRESSION RATES AVAILABLE (1) BASED UPON IMAGE CHARACTERISTICS INDEX S1

| $\sigma(Y)/\{\sigma(Y)+\sigma(Cb)+\sigma(Cr)\}$ | 4 bpp | 2 bpp | 1 bpp | 0.5 bpp |
|---|---|---|---|---|
| $0 \leq S1 < 0.7$ | 4:4:4 | 4:4:4 | 4:4:4 | 4:2:0 |
| $0.7 \leq S1 \leq 1$ | 4:4:4 | 4:2:0 | 4:2:0 | 4:2:0 |

(2) BASED UPON IMAGE CHARACTERISTICS INDEX S2

| $\sigma^2(Y)/\{\sigma^2(Y)+\sigma^2(Cb)+\sigma^2(Cr)\}$ | 4 bpp | 2 bpp | 1 bpp | 0.5 bpp |
|---|---|---|---|---|
| $0 \leq S2 < 0.9$ | 4:4:4 | 4:4:4 | 4:4:4 | 4:2:0 |
| $0.9 \leq S2 \leq 1$ | 4:4:4 | 4:2:0 | 4:2:0 | 4:2:0 |

(3) BASED UPON IMAGE CHARACTERISTICS INDEX S3

| $\sigma(Y)/\{\sigma(Cb)+\sigma(Cr)\}$ | 4 bpp | 2 bpp | 1 bpp | 0.5 bpp |
|---|---|---|---|---|
| $0 \leq S3 < 2.2$ | 4:4:4 | 4:4:4 | 4:4:4 | 4:2:0 |
| $2.2 \leq S3$ | 4:4:4 | 4:2:0 | 4:2:0 | 4:2:0 |

IMAGE DATA CODING APPARATUS AND IMAGE DATA SERVER

INCORPORATION BY REFERENCE

The disclosure of the following priority application is herein incorporated by reference: Japanese Patent Application No. 2001-143676 filed May 14, 2001

BACKGROUND OF THE INVENTION

1. Field of the Invention

The present invention relates to an image data coding apparatus that codes image data through Wavelet transform and an image data server that transmits image data coded through Wavelet transform to a client via a network.

2. Description of the Related Art

There are image data servers in the related art that transmit pre-recorded images at a client's request.

Such image data servers include those that record in advance uncompressed image data which have not been coded and those that record in advance coded data obtained by compression-coding image data. The procedure of the processing implemented after a transmission request is received varies among these image data servers depending upon the format of the pre-recorded data.

For instance, when a transmission request from a client is received, an image data server in which uncoded, uncompressed image data have been recorded also obtains compression-related information indicating either the compression rate for the image data or the required quality of the restored image. Then, the image data server performs compression coding on the image data in conformance to the compression-related information thus obtained and transmits the coded image data to a client.

Image data servers in which coded data have been recorded include image data servers in which coded data having been coded through compression executed at a compression rate (approximately 1/10~1/20) that allows the restored image to achieve a medium image quality are pre-recorded (hereafter referred to as "medium quality compression image data servers"). Such a "medium quality compression image data server" transmits the recorded coded data as they are upon receiving a transmission request from a client.

In addition, image data servers in which coded data have been recorded may be image data servers in which coded data obtained by compressing image data at a compression rate (approximately 1/4~1/8) that allows the restored image to achieve a high image quality are recorded in advance (hereafter referred to as "high quality compression image data servers"). A "high quality compression image data server" can respond to a request for transmission of a high quality image or a high resolution image issued by a client simply by transmitting the recorded coded data as they are. Furthermore, the high quality compression image data server can respond to a request for a transmission of a low quality image or a low resolution image the intent of which is to reduce the data volume by first decompressing the recorded coded data and then re-compression-coding the data at the compression rate conforming to the client's request.

As a new image data coding technology to replace the discrete cosine transform coding technology, Wavelet transform coding has been attracting a great deal of interest. At present, the Committee for Still Image Coding Standard jointly organized by ISO and ITU-T, is in the process of standardizing JPEG 2000 that adopts image data coding through Wavelet transform. It is to be noted that the standardization process for JPEG 2000 has been carried out in six separate parts, and the part (Part 1) that defines the core technology of JPEG 2000 was internationally standardized in December 2000.

FIGS. 7 and 8 present a flowchart of the operation performed in an image data server in the related art that adopts the coding technology defined in the JPEG 2000 Part 1. It is to be noted that the coding technology defined in JPEG 2000 Part 1 is adopted in the operation in the flowchart presented in FIGS. 7 and 8, which is performed by an image data server that records in advance uncoded, uncompressed image data in the RGB colorimetric system.

FIG. 9 is a functional block diagram of such an image data server in the related art.

As shown in FIG. 9, an image data server 100 in the related art includes an image recording device 101 that records in advance image data, a coding unit 102 that codes the image data through compression coding and a network interface unit 103 provided to achieve an interface with a client via a network.

The coding technology defined in the JPEG 2000 Part 1 that is adopted in the image data server 100 in the related art is explained below in reference to FIGS. 7 through 9. It is to be noted that the following explanation is given by assuming that the desired level of compression rate (level 0~level 10) is provided to the network interface unit 103 as compression-related information for purposes of simplification.

First, the image data server 100 repeatedly makes a decision via the network interface unit 103 as to whether or not an image transmission request has been issued by a client (FIG. 7 S101).

Then, upon receiving an image transmission request, the image data server 100 obtains the compression-related information (the level of the desired compression rate) provided by a client via the network interface unit 103 (FIG. 7 S102).

The compression-related information thus obtained is provided to the coding unit 102.

The coding unit 102 reads out from the image recording device 101 the image data corresponding to the image to be transmitted and divides the image data into a plurality of rectangular areas (hereafter referred to as "tile images") (FIG. 7 S103).

Next, the coding unit 102 implements color coordinate conversion on the individual tile images and thus generates image data in the YCbCr colorimetric system (FIG. 7 S104).

Then, the coding unit 102 sets a sub-sampling (culling) ratio for the individual color components (the Y component, the Cb component and the Cr component) of the image data based upon the compression-related information (FIG. 7 S105), and performs sub-sampling of the image data by culling the color difference components (the Cb component and the Cr component) in the image data based upon the sub-sampling ratio setting (FIG. 7 S106).

For instance, if the compression-related information (the desired level of the compression) indicates level 0~level 3, the coding unit 102 sets the sub-sampling ratio for Y, Cb and Cr to "4:4:4", whereas if the compression-related information indicates level 4~level 7, the coding unit 102 sets the sub-sampling ratio for Y, Cb and Cr to "4:2:2". If the compression-related information indicates level 8 or higher, the sub-sampling ratio for Y, Cb and Cr is set to "4:2:0". (B)

of FIG. 10 shows a state achieved by sub-sampling the color difference components with the sub-sampling ratio for Y, Cb and Cr set to "4:2:0".

FIG. 11 illustrates the various sub-sampling ratios.

Next, the coding unit 102 breaks down each of the color components (the Y component, the Cb component and the Cr component) of the sub-sampled image data into a plurality of sub-bands (LL, LH, HL and HH) corresponding to varying resolutions, through discrete Wavelet transform implemented along two directions, i.e., the vertical direction and the horizontal direction (FIG. 7 S107).

The LL sub-band among these sub-bands undergoes a further discrete Wavelet transform and thus is broken down into a plurality of sub-bands (LL, LH, HL and HH). Each component in the image data is broken into sub-bands, as illustrated in (C) of FIG. 10 through the discrete Wavelet transform which is repeated recursively as described above. It is to be noted that in (C) of FIG. 10, breakdown level 0 is designated to the LL sub band and each of three sub-bands, LH, HL and HH, is designated as breakdown level 1, 2, . . . in order of the number of times of undergoing discrete Wavelet transform, with breakdown level 1 designated to a sub-band having undergone discrete Wavelet transform the greatest number of times.

Next, the coding unit 102 quantizes individual Wavelet transform coefficients in conformance to quantization step widths set for the individual sub-bands (FIG. 7 S108).

In the next step, the coding unit 102 divides each quantized Wavelet transform coefficient into blocks in a fixed size which are referred to as code blocks (FIG. 7 S109).

Then, the coding unit 102 expresses the quantized values of the Wavelet transform coefficients in the individual code blocks as a plurality of bit planes, executes entropy coding in units of individual bit planes and thus generates code data in correspondence to the individual code blocks (FIG. 7 S110).

Namely, coded data are generated in units of the individual code blocks for all the sub-bands in each color component.

Next, the coding unit 102 performs arithmetic coding on the coded data that have been generated as described above by employing an MQ coder (FIG. 7 S111).

The coding unit 102 then divides the coded data corresponding to all the coded blocks in conformance to a predetermined layer structure (FIG. 8 S112).

Next, the coding unit 102 groups the divided coded data into packets each containing coded data with a common breakdown level, a common layer and a common color component (FIG. 8 S113). It is to be noted that the packets are each constituted of a header and a body, with the attribute of the coded data constituting the body and the like stored in the header.

In the following step, the coding unit 102 arranges the packets in conformance to a predetermined scalability (e.g., SNR scalability) and generates a code stream achieving a data volume corresponding to the desired compression rate (FIG. 8 S114).

Then, the code stream thus generated is transmitted as the final coded data to a client via the network interface unit 103 (FIG. 8 S115).

As explained above, the image data server 100 in the related art that adopts the coding technology defined in the JPEG 2000, Part 1 realizes compression coding implemented at the desired compression rate requested by a client by executing the processing in step S108 and subsequent steps after sub-sampling the color difference components in the sub-sampling process executed in step S106 in FIG. 7.

However, when coding image data through compression coding as described above, the processing from FIG. 7 S102~FIG. 8 S115 must be executed repeatedly each time an image transmission request from a client is received. For this reason, a heavy load is placed on the coding unit 102 and thus, a problem arises in that the image data server cannot respond quickly to a client's request for a transmission.

In addition, since it is necessary to record in advance uncoded, uncompressed image data in the image data server 100, the image recording device 101 must have a large storage capacity.

"The medium quality compression image data server" and the "high quality compression image data server" explained earlier that record coded data obtained through compression coding do not require a recording device with a large capacity.

However, the "medium quality compression image data server" is only capable of transmitting coded data obtained by compression coding at a predetermined compression rate (approximately $\frac{1}{10} \sim \frac{1}{20}$). For this reason, there are problems in that the data volume cannot be reduced when it is desired to transmit the image data with high efficiency and in that the image data server cannot respond to a client's request for transmission of a high quality image or a high resolution image.

In addition, if a client requests a transmission of a low quality image or a low resolution image, the "high quality compression image data server" must first decompress coded data having been performed with compression coding and then re-code the data through the processing such as that shown in FIG. 7 S102~FIG. 8 S115. Thus, the image data server cannot respond quickly to the transmission request from a client. There is another problem in that since such re-coding cannot be implemented without first decompressing the data, the quality of the image reproduced based upon the coded data resulting from the re-coding processing becomes poor compared to the quality of the image reproduced based upon coded data obtained by compression coding of uncompressed image data.

SUMMARY OF INVENTION

The present invention provides an image data coding apparatus capable of coding image data in conformance to a desired compression rate or a desired quality for the restored image with ease. It also provides an image data server capable of coding image data in conformance to the desired compression rate or a desired quality for the restored image with ease and speed while minimizing the deterioration of the image quality.

The image data coding apparatus according to the present invention having a coding unit that generates coded data after generating a transform (or conversion) coefficient by implementing Wavelet transform on image data comprises a storage unit that stores coded data which the coding unit generates by coding image data which have not been sub-sampled, an information-obtaining unit that obtains compression-related information indicating a compression rate or a restored image quality and a re-coding unit that changes a sub-sampling ratio of individual color components constituting the coded data stored in the storage unit in conformance to the compression-related information and generates new coded data.

In this image data coding apparatus, the information-obtaining unit may obtain either compression-related information set by the operator or compression-related information provided from an external apparatus. In addition, the new coded data generated by the re-coding unit may be recorded into an internal recording device or they may be transferred to an external apparatus.

In other words, the invention described above may be adopted in an electronic camera having an operating unit operated to set compression-related information or an image transfer apparatus (which may include an electronic camera having a coded data transfer function) having a function of receiving compression-related information provided by the transfer recipient.

As long as coded data can be recorded into a detachable recording medium (e.g., a PC card) even if the electronic camera does not have a coded data transfer function, the coded data recorded in the recording medium can be transferred via a personal computer or the like. The operator of such an electronic camera is able to set information indicating a specific compression rate or a specific restored image quality (equivalent to the compression-related information) through a specific operating unit and is able to output the desired coded data to the recording medium. Thus, coded data having been compressed in response to a request issued by the transfer recipient can be transferred by adopting the present invention described above in an electronic camera that does not have the coded data transfer function, as well.

In the image data coding apparatus described above, the image data comprise a brightness (or luminance) component and color difference components, and the re-coding unit may determine a new sub-sampling ratio to be set in conformance to characteristics of the image data obtained based upon at least either the brightness component or the color difference components in addition to the compression-related information.

In other words, in this image data coding apparatus, the sub-sampling ratio of the various color components constituting the coded data stored in the storage unit is changed in conformance to the characteristics of the image data as well as the compression-related information to generate new coded data.

It is to be noted that the characteristics of the image data obtained based upon at least either the brightness component and the color difference components include, for instance, the "rate of the volume of the color difference component information relative to the volume of the entire image data".

In addition, the sub-sampling ratio should be determined in correspondence to the "rate of the volume of the color difference component information relative to the volume of the entire image data" so as to lower the ratio of the color difference components if the "rate of the volume of the color difference component information to the volume of the entire image data" is low and so as to raise the ratio of the color difference component if the "rate of the volume of the color difference component information to the volume of the entire image data" is high.

Furthermore, the coding unit may generate the coded data in units of individual tile images obtained by dividing the image data of the image space and the re-coding unit may change the sub-sampling ratio of the color components constituting coded data corresponding to each of the tile images in conformance to the characteristics of the tile images and the compression-related information and generate new coded data accordingly.

In the image data coding apparatus described above, the re-coding unit may convert data corresponding to a high frequency component in the coded data stored in the storage unit to invalid data or it may delete the data corresponding to the high-frequency component to generate new coded data, and in such a case, the re-coding unit may change the sub-sampling ratio by increasing/decreasing the data to be converted to invalid data or to be deleted.

The invalid data in this context may be, for instance, data continuously indicating 0.

The image data server according to the present invention having a coding unit that generates coded data after generating a transform coefficient by implementing Wavelet transform on image data comprises a storage unit that stores coded data which the coding unit generates by coding image data which have not been sub-sampled, an information obtaining unit that obtains an image transmission request issued by a client and compression-related information indicating a compression rate or a restored image quality, a re-coding unit that changes a sub-sampling ratio of individual color components constituting the coded data stored in the storage unit in conformance to the compression-related information and generates new coded data, and a transmission unit that transmits the new coded data generated by the re-coding unit to a client.

BRIEF DESCRIPTION OF THE DRAWINGS

FIG. 4 is provided to facilitate an explanation of another example of the processing through the Wavelet transform executed by the coding unit;

FIG. 5 presents a flowchart of the operation performed by the image data server when a client has issued a transmission request;

FIG. 6 presents examples of how the sub-sampling ratio may be set;

DESCRIPTION OF THE PREFERRED EMBODIMENT

The following is a detailed explanation of an embodiment of the present invention, given in reference to the drawings.

Figure 1:
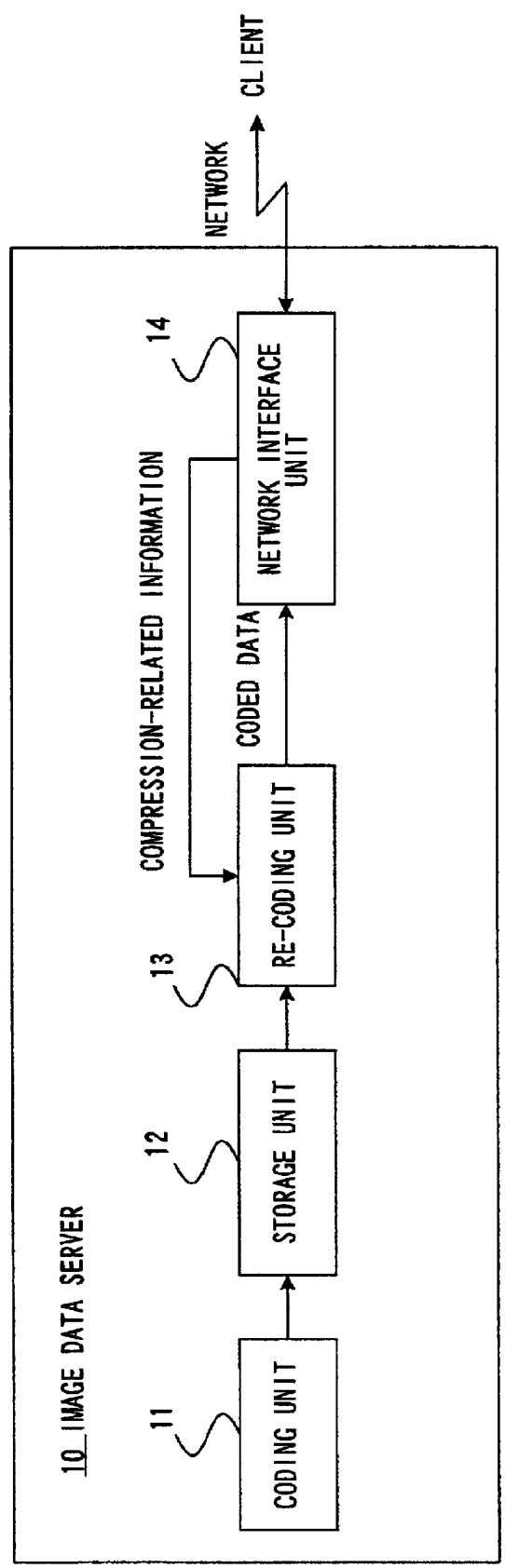
FIG. 1 is a functional block diagram of an image data server achieved in an embodiment of the present invention.

FIG. 1 is a functional block diagram of the image data server achieved in the embodiment of the present invention. An image data server 10 in FIG. 1 comprises a coding unit 11, a storage unit 12, a re-coding unit 13 and a network interface unit 14.

It is to be noted that the image data server 10 may be an image data server having a function of generating coded data, a function of storing the coded data, a function of obtaining compression-related information and a function of generating new coded data, or it may be an image data server having an additional function of transmitting the new coded data to a client. The network interface unit 14 is connected to any of various types of networks such as the Internet and an intra-net, and various types of information are exchanged via the network interface unit 14. The network interface unit 14 embodies a lower-order concept of the information obtaining unit.

The coding unit 11 in the image data server 10 achieved in the embodiment codes image data without sub-sampling them, and adopts the coding technology defined in the JPEG 2000 Part 1 as does the coding unit 102 in the image data server 100 in the related art.

Figure 2:
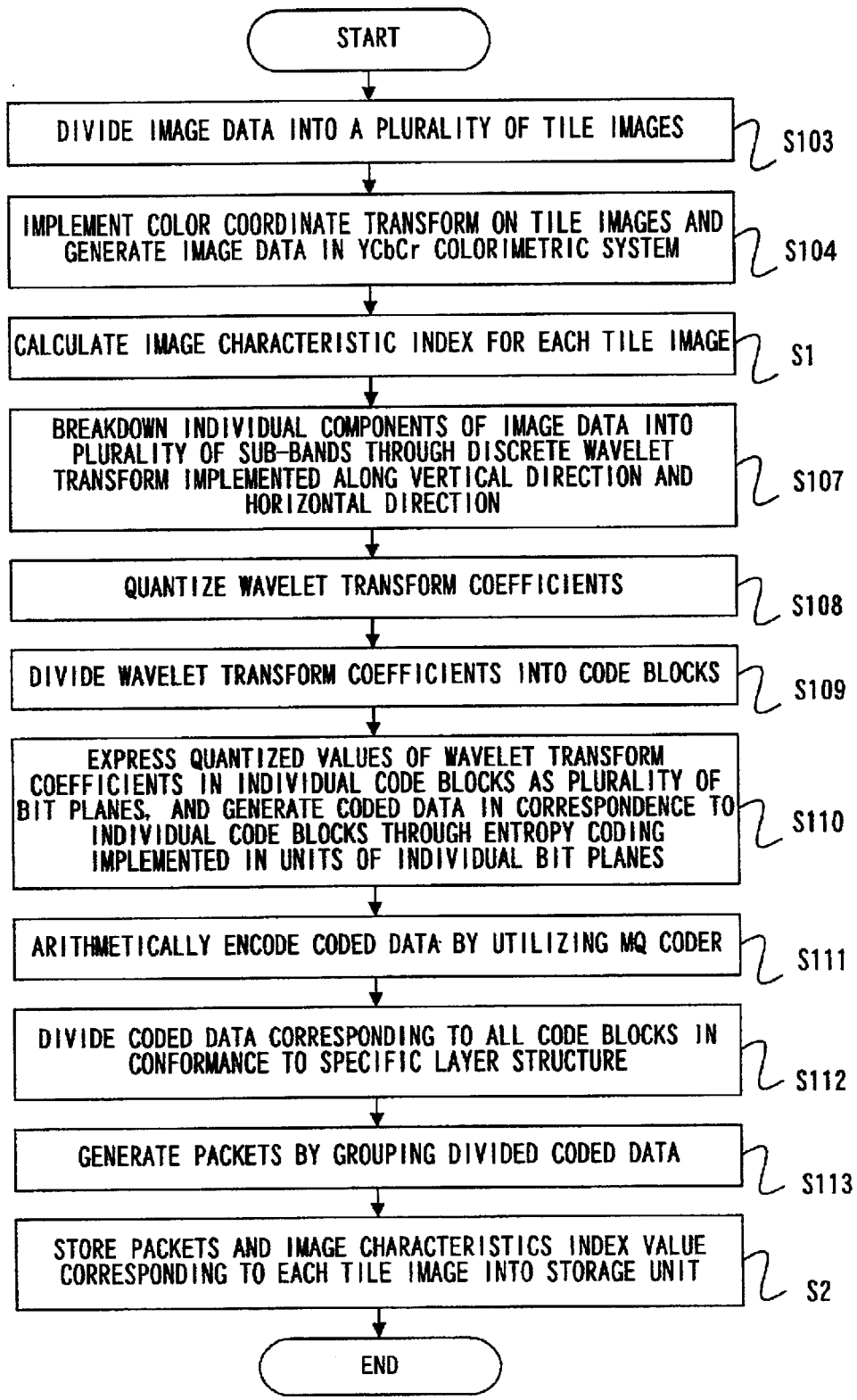
FIG. 2 presents a flowchart of the operation performed in the coding unit.

FIG. 2 presents a flowchart of the operation performed by the coding unit 11.

Figure 7:
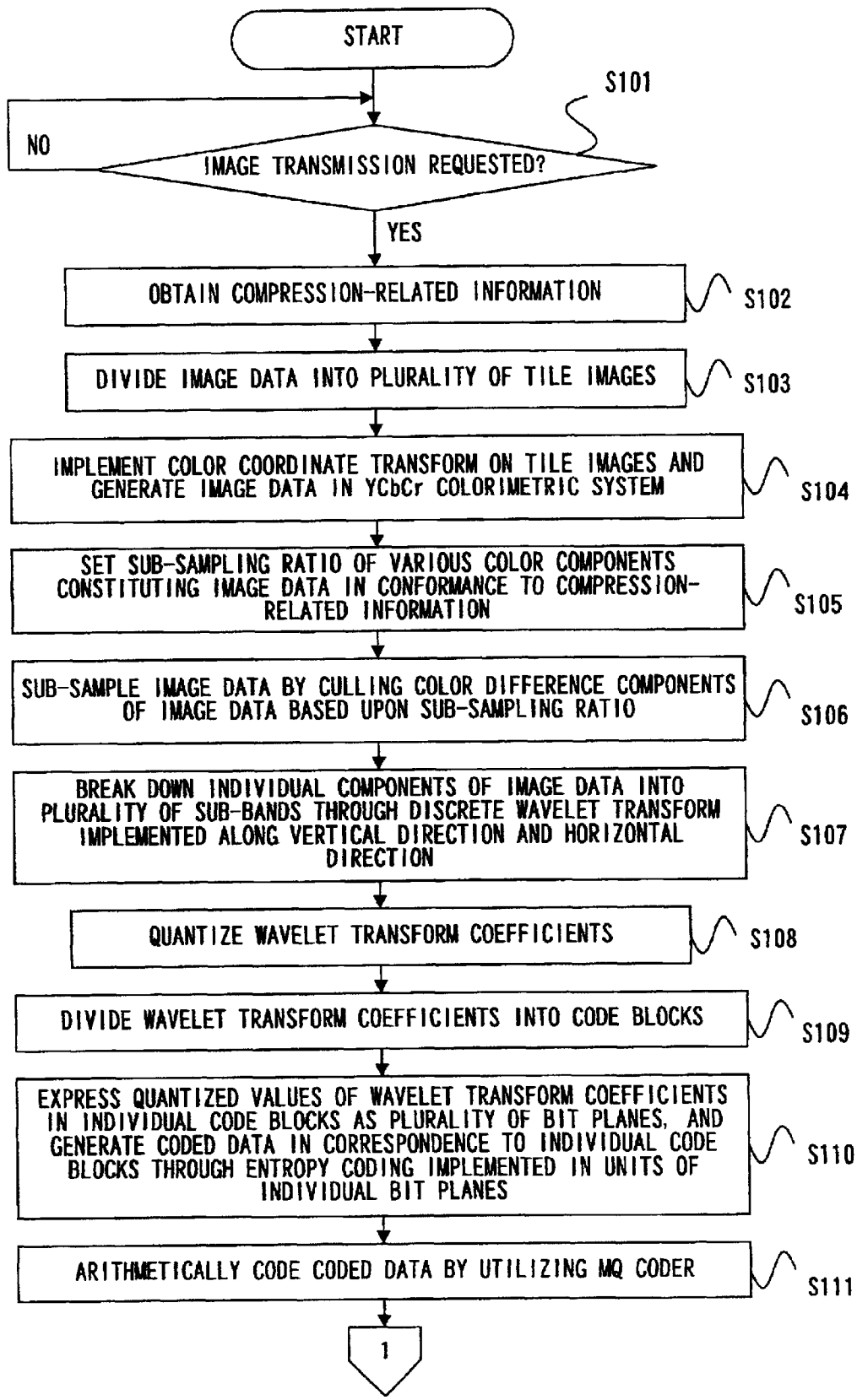
FIG. 7 presents a flowchart of the operation performed by an image data server in the related art which adopts the coding technology defined in the JPEG 2000 Part 1.
Figure 8:
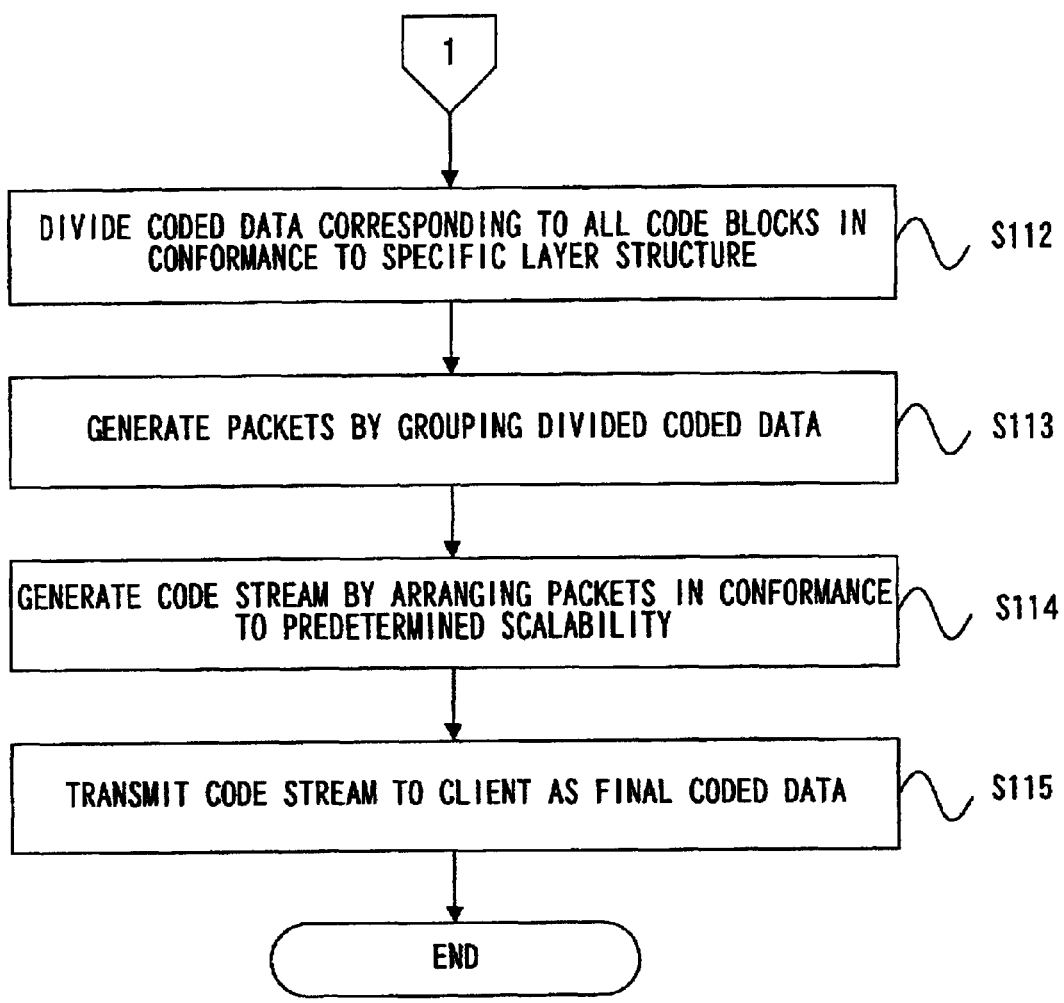
FIG. 8 presents the flowchart (continued) of the operation performed by the image data server in the related art which adopts the coding technology defined in the JPEG 2000 Part 1.
Figure 9:
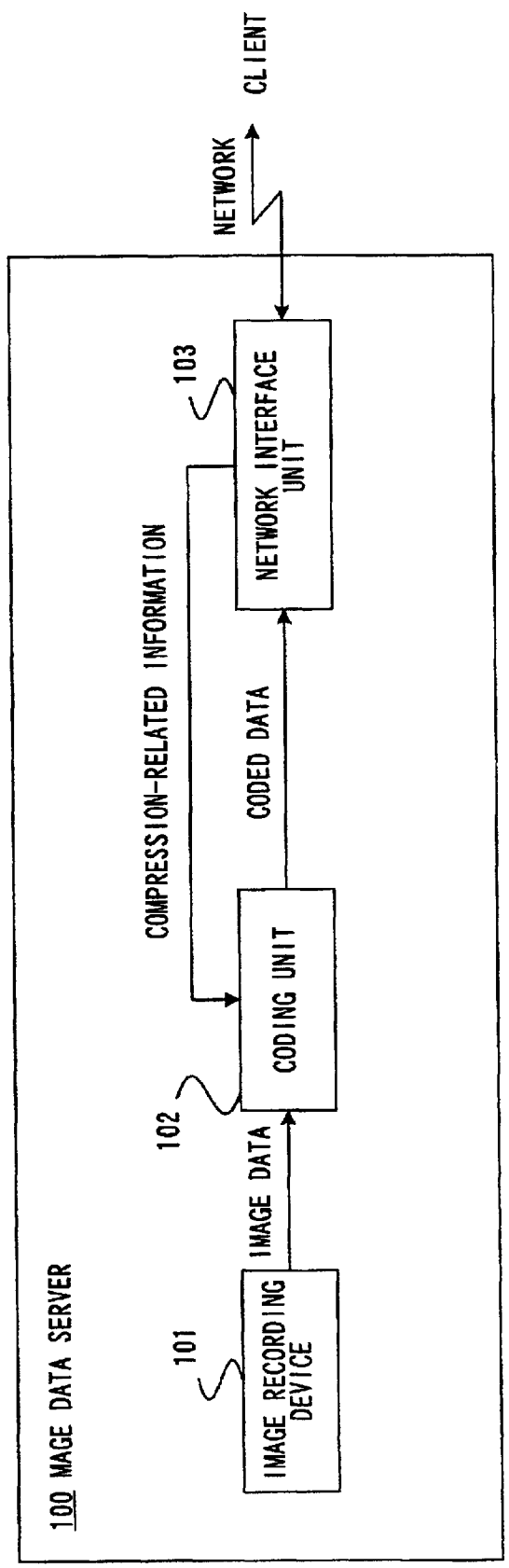
FIG. 9 is a functional block diagram of an image data server in the related art.
Figure 10:
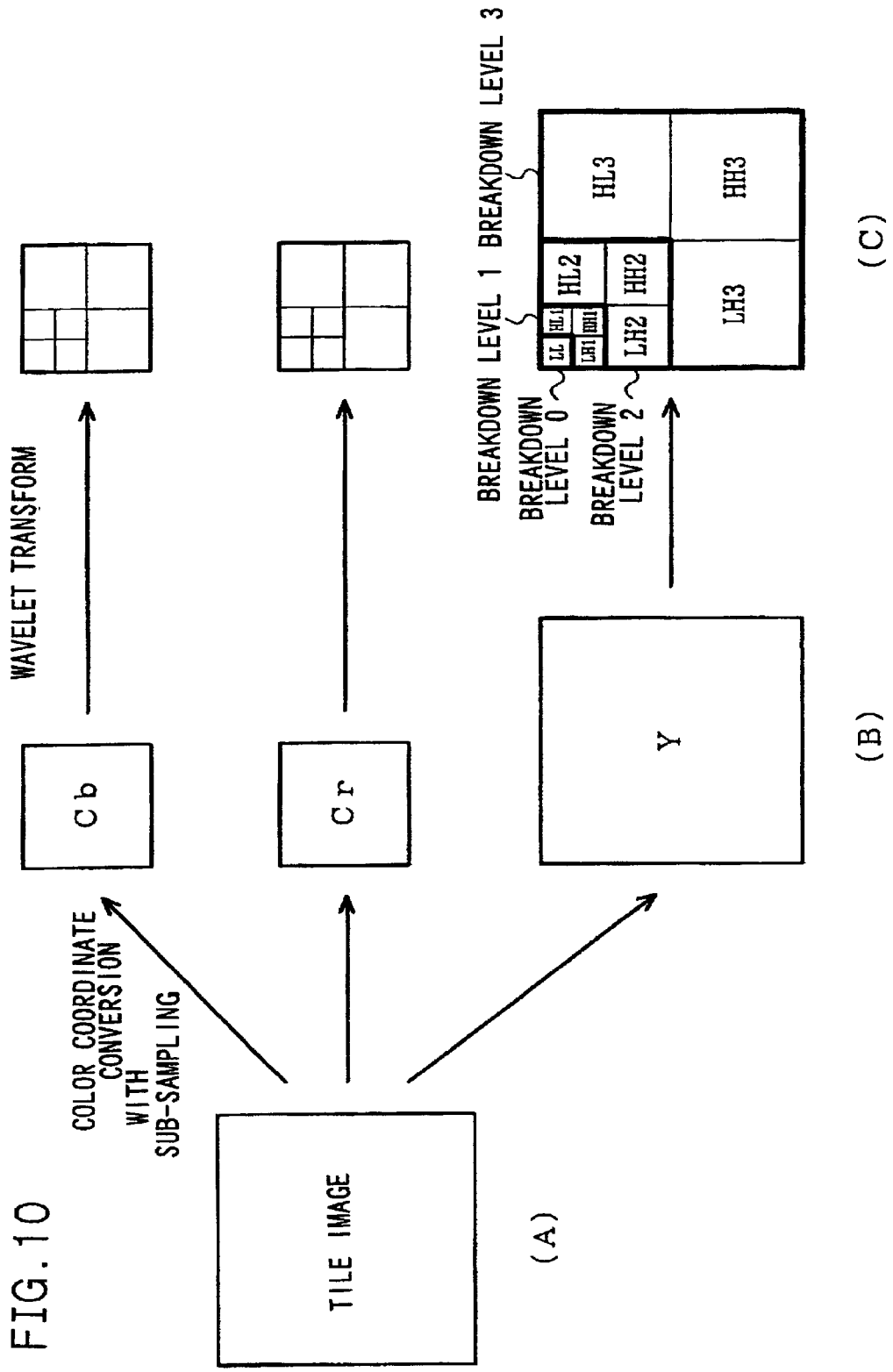
FIG. 10 is provided to facilitate an explanation of the processing through Wavelet transform executed by the coding unit.
Figure 11:
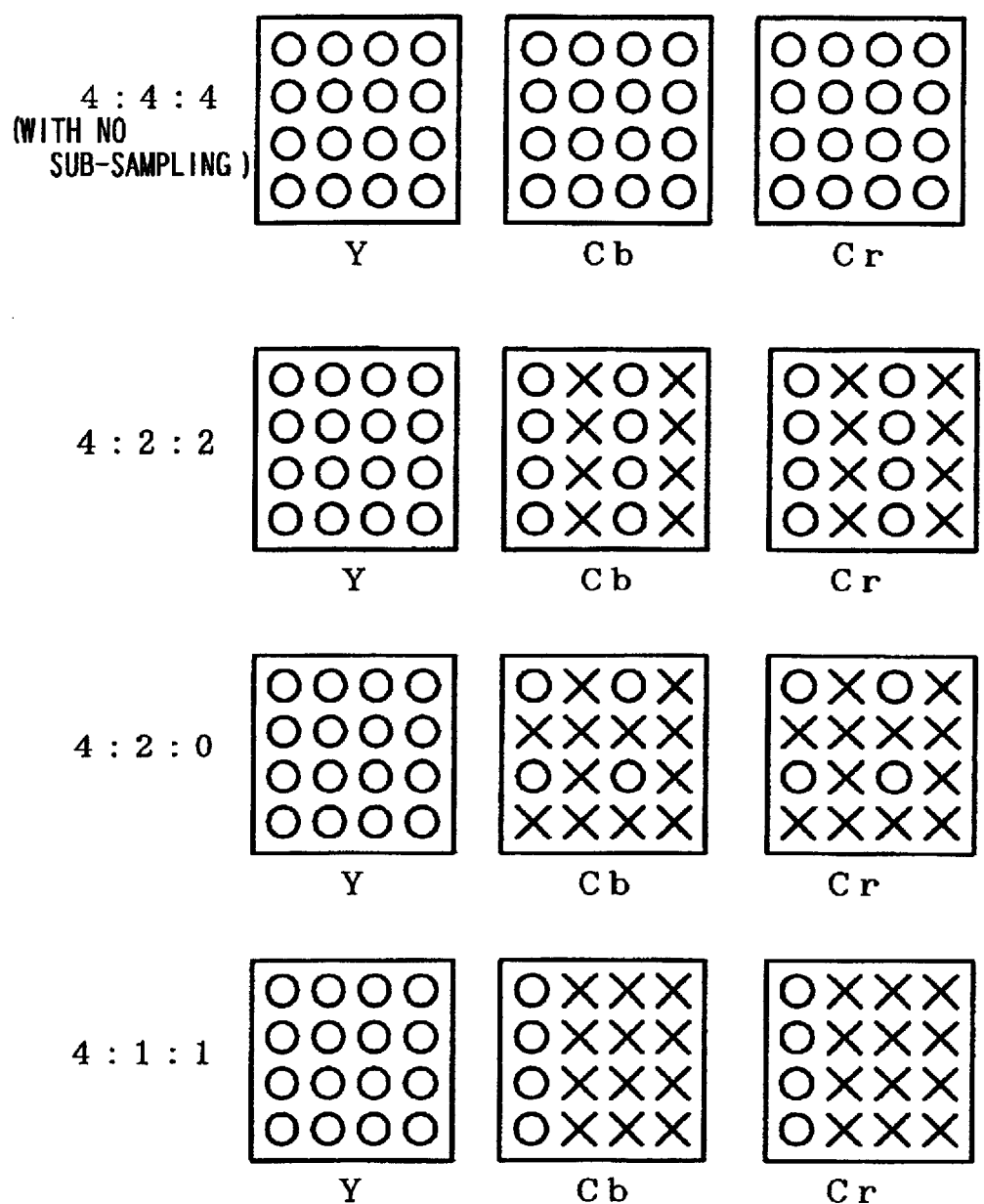
FIG. 11 is provided to facilitate an explanation of sub-sampling ratios.

It is to be noted that the same step numbers as those in FIGS. 7 and 8 are assigned to the steps in FIG. 2 in which processing similar to that performed by the coding unit 102 in the image data server 100 in the related art is implemented.

The following is an explanation of the operation performed by the coding unit 11, given in reference to FIG. 2.

Figure 3:
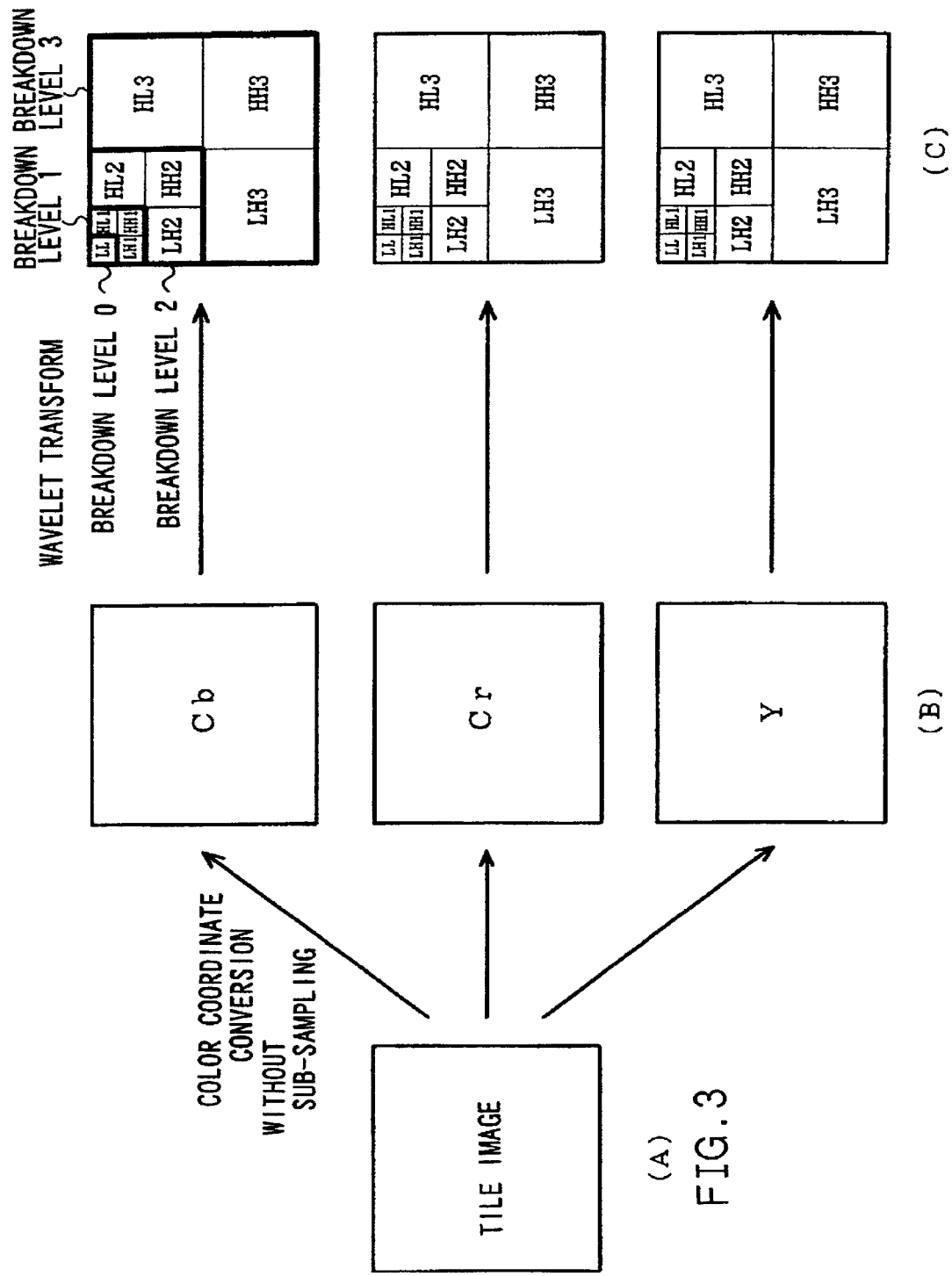
FIG. 3 is provided to facilitate an explanation of the processing through Wavelet transform executed by the coding unit.

First, the coding unit 11 divides the image data into a plurality of tile images (FIG. 2 S103) and generates image data in the YCbCr colorimetric system by implementing color coordinate conversion on the individual tile images (FIG. 2 S104) as does the coding unit 102. However, it does not sub-sample the image data by culling the color difference components at this time. (B) of FIG. 3 shows image data in the YCbCr colorimetric system generated through the color coordinate conversion.

As in the image data server 100 in the related art, the sub-sampling ratio of the color components (the Y component, the Cb component and the Cr component) of the image data constituting each tile image is set after the compression-related information is provided by a client in the image data server 10 in the embodiment. While a uniform sub-sampling ratio may be set for all the tile images in conformance to the compression-related information alone, the sub-sampling ratio is set for each tile image in conformance to the characteristics of the tile image as well as the compression-related information in the embodiment.

In this embodiment, the rate of the volume of the color difference component information relative to the volume of the image data in the YCbCr colorimetric system is used as the characteristics of each tile image and this rate is indicated as the value of an index (hereafter referred to as an "image characteristics index") calculated by using standard deviation σ(Y), σ(Cb) and σ(Cr) manifesting at the Y plane, the Cb plane and the Cr plane respectively. It is to be noted that such an image characteristics index should be preferably calculated by using the image data in the YCbCr colorimetric system equivalent to that tile image, which has not been coded yet.

Accordingly, the image characteristics indices for the individual tile images are calculated in the embodiment when the image data in the YCbCr colorimetric system for the individual tile images are generated.

Namely, upon generating the image data in the YCbCr colorimetric system in correspondence to each tile image as described above, the coding unit 11 calculates the image characteristic indices for the individual tile images (FIG. 2 S1).

For instance, an image characteristics index obtained through such a process may be any one of image characteristics indices S1~S3 respectively calculated through the following expressions 1~3.

Image characteristics index S1:
$\sigma(Y)/(\sigma(Y)+\sigma(Cb)+\sigma(Cr))$     expression 1

Image characteristics index S2:
$\sigma^2(Y)/(\sigma^2(Y)+\sigma^2(Cb)+\sigma^2(Cr))$     expression 2

Image characteristics index S3:
$\sigma(Y)/(\sigma(Cb)+\sigma(Cr))$     expression 3

In addition, with Nx representing the number of pixels along the x axis in the image data, Ny representing the number of pixels along the y axis and Y[i, j], Cb[i, j] and Cr[i, j] respectively representing the values of the Y component, the Cb component and the Cr component respectively at a given pixel, the averages <Y>, <Cb> and <Cr> on the Y plane, the Cb plane and the Cr plane respectively and the standard deviations σ(Y), σ(Cb) and σ(Cr) on the individual planes can be calculated through the following expressions 4~9.

$$\sigma(Y) = \sqrt{\frac{1}{NxNy}\sum_{i=1}^{Nx}\sum_{j=1}^{Ny}(Y[i,j]-\langle Y \rangle)^2} \quad \text{expression 4}$$

$$\sigma(Cb) = \sqrt{\frac{1}{NxNy}\sum_{i=1}^{Nx}\sum_{j=1}^{Ny}(Cb[i,j]-\langle Cb \rangle)^2} \quad \text{expression 5}$$

$$\sigma(Cr) = \sqrt{\frac{1}{NxNy}\sum_{i=1}^{Nx}\sum_{j=1}^{Ny}(Cr[i,j]-\langle Cr \rangle)^2} \quad \text{expression 6}$$

$$\langle Y \rangle = \frac{1}{NxNy}\sum_{i=1}^{Nx}\sum_{j=1}^{Ny}Y[i,j] \quad \text{expression 7}$$

$$\langle Cb \rangle = \frac{1}{NxNy}\sum_{i=1}^{Nx}\sum_{j=1}^{Ny}Cb[i,j] \quad \text{expression 8}$$

$$\langle Cr \rangle = \frac{1}{NxNy}\sum_{i=1}^{Nx}\sum_{j=1}^{Ny}Cr[i,j] \quad \text{expression 9}$$

Next, as does the coding unit 102, the coding unit 11 breaks down each of the color components constituting the image data in the YCbCr colorimetric system corresponding to each tile image into a plurality of sub-bands through discrete Wavelet transform implemented along two directions, i.e., along the vertical direction and the horizontal direction (FIG. 2 S107). (C) of FIG. 3 shows each color component in the image data broken down into a plurality of sub-bands through the discrete Wavelet transform implemented along the vertical direction and the horizontal direction.

It is to be noted that while the individual color components (the Y component, the Cb component and the Cr component) corresponding to each tile image are broken down through the discrete Wavelet transform implemented along the vertical direction and the horizontal direction in this example, the discrete Wavelet transform may be implemented on the individual color components corresponding to each tile image along a single direction at a time, first along the horizontal direction and then along the vertical direction, as shown in (C-1) and (C-2) in FIG. 4, instead.

Next, as does the coding unit 102, the coding unit 11 quantizes Wavelet transform coefficients (FIG. 2 S108) and divides the quantized Wavelet transform coefficients into code blocks (FIG. 2 S109).

Then, as does the coding unit 102, the coding unit 11 expresses the quantized values of the Wavelet transform coefficients in the individual coded blocks as a plurality of bit planes, implements entropy coding in units of individual bit planes and generates coded data for each coded block (FIG. 2 S110).

In the next step, as does the coding unit 102, the coding unit 11 implements mathematical coding on the coded data by employing an MQ coder (FIG. 2 S111).

Next, as does the coding unit 102, the coding unit 11 divides the coded data in conformance to a specific layer structure (FIG. 2 S112), and then groups the divided coded data into packets each containing coded data sharing a common breakdown level, a common layer and a common color component (FIG. 2 S113).

Lastly, the coding unit 11 stores the packets corresponding to the individual tile images and the values of the image characteristics indices calculated in FIG. 2 S1 into the storage unit 12 (FIG. 2 S2).

Namely, the coded data in the packet format corresponding to the individual tile images and the image characteristics index values are stored into the storage unit 12 in advance before a transmission request from a client is received.

FIG. 5 presents a flowchart of the operation performed by the image data server 10 when there is a transmission request from a client.

The following is an explanation of the operation performed by the image data server 10 when a client requests a transmission, given in reference to FIG. 5.

First, the image data server 10 makes a decision via the network interface unit 14 as to whether or not a request for an image transmission has been issued by a client (FIG. 5 S10).

If it is decided that an image transmission request has been issued, the image data server 10 obtains the compression-related information provided by a client (FIG. 5 S11).

It is to be noted that while the compression-related information may indicate a compression rate level or a level of the quality of the restored image as in the image data server 100 in the related art, the compression-related information provided in this example indicates a desired compression rate.

However, in order to simplify the explanation, it is assumed in this example that a plurality of compression rates are made available in advance, one of these compression rates is selected by a client and the selected compression rate is provided as the compression-related information to the image data server 10. For instance, three different compression rates 4 bpp, 2 bpp and 1 bpp may be made available in advance or four compression rates 4 bpp (bits/pixel), 2 bpp, 1 bpp and 0.5 bpp may be made available in advance.

Once such compression-related information is obtained, the re-coding unit 13 reads out the packets and the image characteristics index values in correspondence to the individual tile images making up the image to be transmitted from the storage unit 12. Then, the re-coding unit 13 sets the sub-sampling ratio of the color components (the Y component, the Cb component and the Cr component) in conformance to the image characteristics index value and the compression related information for each tile image (FIG. 5 S12).

For instance, if the image characteristics index value is equal to or larger than a predetermined value, the re-coding unit 13 judges that the rate of the volume of the color difference component information is low and accordingly sets the sub-sampling ratio so as to lower the ratio of the volume of the color difference component information. If, on the other hand, the image characteristics index value is smaller than the predetermined value, it judges that the rate of the volume of the color difference component information is high, and accordingly sets the sub-sampling ratio to raise the ratio of the volume of the color difference component information.

FIG. 6 presents examples of sub-sampling ratio settings.

It is to be noted that while FIG. 6 shows examples in which the sub-sampling ratio is set to either "4:4:4" or "4:2:0", "4:2:2" representing an intermediate ratio may also be used to allow one of the three sub-sampling ratios to be selected.

Next, the re-coding unit 13 generates a code stream conforming to a predetermined level of scalability by replacing the packets corresponding to a low breakdown level (the highfrequency component) among the packets containing the color difference component data in each tile image with packets each containing body data that indicate the value of 0 only (hereafter referred to as "all 0 packets") (FIG. 5 S13).

It is to be noted that the sub-sampling ratio setting determines exactly which low-breakdown level packets are to be replaced with "all 0 packets".

For instance, if the color difference components of each tile image are broken down into breakdown level 0~breakdown level 3 as shown in (C) of FIG. 3, the re-coding unit 13 replaces the packets corresponding to breakdown level 3 (the lowest breakdown level) of the Cb component and the Cr component in each tile image for which the sub-sampling ratios of Y, Cb and Cr is set to "4:2:0" with "all 0 packets".

In addition, when a given tile image has its sub-sampling ratio for Y, Cb and Cr set to "4:2:2", the packets corresponding to HH3 and HL3 at breakdown level 3 (the lowest breakdown level) of the Cb component and the Cr component are replaced with "all 0 packets".

It is to be noted that none of the packets in a tile image having a sub-sampling ratio for Y, Cb and Cr set to "4:4:4" are replaced with "all 0 packets" by the re-coding unit 13.

The code streams generated as explained above are transmitted to a client via the network interface unit 14. During the transmission process, the data transmission is terminated once the volume of the transmitted data in the code stream reaches of volume corresponding to the desired compression rate (FIG. 5 S14).

When the data in the code streams that have been transmitted as described above are decoded on a client side, the "all 0 packets" are handled as invalid data that do not affect the quality of the image obtained through the decoding process.

Accordingly, the quality of the image restored by using the code streams transmitted by the image data server 10 in the embodiment can be considered comparable to the quality of the image restored with the code stream data obtained by sub-sampling the color difference components in the image data server 100 in the related art.

In addition, since the volume of the data corresponding to the "all 0 packets" is insignificant, the volume of the code stream data transmitted by the image data server 10 in the embodiment can be considered approximately equal to the volume of the code stream data obtained by sub-sampling the color difference components in the image data server 100 in the related art.

In other words, the image data server 10 in the embodiment replaces the packets of color different data corresponding to a low breakdown level with "all 0 packets" in conformance to the sub-sampling ratio setting instead of sub-sampling the color difference components in conformance to the sub-sampling ratio setting, to achieve similar compression results.

Furthermore, the processing for replacing the color difference components packets corresponding to the low breakdown level with "all 0 packets" in conformance to the sub-sampling ratio setting is executed without decoding the coded data stored in the storage unit 12 in advance as packets. Thus, since it is not necessary to repeatedly generate packets each time a transmission request from a client is received once the packets are generated and stored in the storage unit 12, the image data server 10 in the embodiment is capable of responding to a client's request for a transmission more speedily than the image data server 100 in the related art.

In addition, since packet format image data are stored in the storage unit 12 at the image data server 10 in the embodiment, the storage unit 12 does not need to have a recording capacity as large as that required in an image data server in which uncoded, uncompressed image data are recorded.

Moreover, since the sub-sampling ratio is set for each tile image based upon the characteristics of the image, and more specifically, the characteristics of the particular tile image as well as the compression-related information in the image data server 10 in the embodiment, the volumes of information corresponding to the individual color components can be adjusted to achieve correct proportions for each tile image. As a result, the quality of the image having undergone the coding process does not deteriorate as much as when image data are coded at a uniform sub-sampling ratio set for all the tile images.

It is to be noted that while a code stream is generated in the embodiment by replacing the color difference components packets corresponding to the low breakdown level with "all 0 packets", a code stream may be generated by eliminating the color difference components packets corresponding to the low breakdown level. However, when the color difference components packets corresponding to the low breakdown level are eliminated in this manner, information indicating such deletion must be added into the header of the code stream.

In addition, while packets corresponding to the individual tile images are stored in the storage unit 12 and a code stream is generated by the re-coding unit 13 in the embodiment, the code stream generation by the re-coding unit 13 may be omitted if a single scalability mode is selected in advance by executing processing for rearranging the packets in conformance to the scalability mode to generate a code stream at the coding unit 11 in advance and by storing the code stream thus generated in the storage unit 12.

Moreover, while image data in the YCbCr colorimetric system are generated through the color coordinate conversion implemented on tile images in the embodiment, image data may instead be generated in any of various colorimetric systems including the YUV colorimetric system, the Lab colorimetric system, the GCbCr colorimetric system, the YIQ colorimetric system and the G(R-G) (B-G) colorimetric system.

While a single piece of compression-related information is obtained for the entire image data to be transmitted and the common compression-related information is utilized when setting the sub-sampling ratios for the individual tile images in the embodiment, compression-related information may instead be individually obtained for each tile image to be used when setting the sub-sampling ratio of the tile image.

The coding function achieved by an image data coding apparatus is adopted in an image data server in the embodiment. However, this image data coding apparatus may be adopted in any system other than an image data server as long as the system codes image data through Wavelet transform (in conformance to JPEG 2000 Part 1, for instance). Such systems include an electronic camera provided with an operating unit operated to set compression-related information and an image data transfer apparatus (which may include an electronic camera having a coded data transfer function) that achieves a function of receiving compression-related information provided by a transfer recipient.

As explained above, coded data corresponding to the compression rate indicated by compression-related information or coded data corresponding to the quality of the restored image indicated by the compression-related information can be generated as new coded data simply by changing the sub-sampling ratio of the various color components constituting pre-recorded coded data in conformance to the compression-related information in the embodiment. In other words, coded data corresponding to the desired compression rate or coded data corresponding to the desired quality for the restored image can be generated with ease and speed. As a result, the length of the processing time elapsing between the reception of a request for an image transmission issued by a client and the actual transmission can be reduced.

Furthermore, since the sub-sampling ratio of the various color components constituting the coded data can be varied in conformance to the characteristics of the image data in addition to the compression-related information, the volumes of information corresponding to the individual color components can be adjusted to achieve correct proportions, which makes it possible to generate coded data that will minimize the deterioration of the image quality. In particular, since the sub-sampling ratio of the color components constituting the coded data in each tile image can be adjusted in conformance to the characteristics of the tile image and the compression-related information, the distribution of the information volumes in small areas of the image can be adjusted, and thus, coded data that will minimize the deterioration of the image quality can be generated.

Moreover, an operation that achieves an effect similar to that realized by changing the sub-sampling ratio of the individual color components constituting coded data can be executed with ease and with speed. In addition, since coded data generated by the coding unit can be stored, the recording device does not need to have a large capacity which would otherwise be required to record uncoded, uncompressed image data.

The above described embodiment is an example, and various modifications can be made without departing from the spirit and scope of the invention.

What is claimed is:

1. An image data coding apparatus having a coding unit that generates coded data after generating a transform coefficient by implementing Wavelet transform on image data, comprising:

a storage unit that stores coded data which the coding unit generates by coding image data which have not been sub-sampled;

an information obtaining unit that obtains compression-related information indicating a compression rate or a restored image quality; and a re-coding unit that changes a sub-sampling ratio of individual color components constituting the coded data stored in the storage unit in conformance to the compression-related information and generates new coded data.

2. An image data coding apparatus according to claim 1, wherein:
the image data comprise a brightness component and a color difference components; and
the re-coding unit determines a new sub-sampling ratio to be set in conformance to characteristics of the image data obtained based upon at least either the brightness component or the color difference components in addition to the compression-related information.

3. An image data coding apparatus according to claim 2, wherein:
the coding unit generates coded data in units of individual tile images obtained by dividing the image data on an image space; and
the re-coding unit changes the sub-sampling ratio of the color components constituting coded data corresponding to each of the tile images in conformance to characteristics of the tile image and the compression-related information and generates new coded data accordingly.

4. An image data coding apparatus according to claim 1, wherein:
the re-coding unit converts data corresponding to a high frequency component in the coded data stored in the storage unit to invalid data or eliminates the data corresponding to the high-frequency component to generate new coded data, and change the sub-sampling ratio by increasing/decreasing the data to be converted to invalid data or to be deleted.

5. An image data coding apparatus according to claim 2, wherein:
the re-coding unit converts data corresponding to a high frequency component in the coded data stored in the storage unit to invalid data or eliminates the data corresponding to the high-frequency component to generate new coded data, and change the sub-sampling ratio by increasing/decreasing the data to be converted to invalid data or to be deleted.

6. An image data coding apparatus according to claim 3, wherein:
the re-coding unit converts data corresponding to a high frequency component in the coded data stored in the storage unit to invalid data or eliminates the data corresponding to the high-frequency component to generate new coded data, and change the sub-sampling ratio by increasing/decreasing the data to be converted to invalid data or to be deleted.

7. An image data server having a coding unit that generates coded data after generating a transform coefficient by implementing Wavelet transform on image data, comprising:
a storage unit that stores coded data which the coding unit generates by coding image data which have not been sub-sampled;
an information obtaining unit that obtains an image transmission request issued by a client and compression-related information indicating a compression rate or a restored image quality;
a re-coding unit that changes a sub-sampling ratio of individual color components constituting the coded data stored in the storage unit in conformance to the compression-related information and generates new coded data; and
a transmission unit that transmits the new coded data generated by the re-coding unit to a client.

* * * * *